(12) United States Patent
Jasteh

(10) Patent No.: US 10,451,303 B1
(45) Date of Patent: Oct. 22, 2019

(54) ELECTRONIC DETECTION OF VENT BLOCKAGE AND BLOWER MALFUNCTION IN TEMPERATURE CONTROL SYSTEMS

(71) Applicant: Rheem Manufacturing Company, Atlanta, GA (US)

(72) Inventor: Sina Jasteh, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 16/048,898

(22) Filed: Jul. 30, 2018

(51) Int. Cl.
  *F24F 11/38* (2018.01)
  *F24F 11/74* (2018.01)
(52) U.S. Cl.
  CPC .............. *F24F 11/38* (2018.01); *F24F 11/74* (2018.01)
(58) Field of Classification Search
  CPC .................................. F24F 11/38; F24F 11/74
  USPC .................................................. 318/400, 433
  See application file for complete search history.

(56) References Cited

U.S. PATENT DOCUMENTS

| | | | | | |
|---|---|---|---|---|---|
| 4,527,247 A | * | 7/1985 | Kaiser | ...................... | A01G 9/26 700/278 |
| 5,019,757 A | * | 5/1991 | Beifus | ................... | F04D 27/004 318/400.07 |
| 5,524,556 A | * | 6/1996 | Rowlette | ................... | F23N 1/06 110/159 |
| 5,806,440 A | * | 9/1998 | Rowlette | ................... | F23N 1/06 110/162 |
| 6,950,029 B2 | * | 9/2005 | Enzinna | ................ | F04D 27/008 318/613 |
| 7,438,705 B2 | * | 10/2008 | Karpowicz | ......... | A61M 1/0001 604/313 |
| 8,655,491 B2 | * | 2/2014 | Hadzidedic | .............. | F24F 11/77 700/276 |
| 8,872,077 B2 | * | 10/2014 | Gagas | .................. | H05B 6/1209 219/620 |
| 2006/0054155 A1 | * | 3/2006 | Bujeau | ..................... | A21B 3/04 126/21 A |
| 2007/0016152 A1 | * | 1/2007 | Karpowicz | ......... | A61M 1/0001 604/326 |
| 2008/0185376 A1 | * | 8/2008 | Gagas | .................. | H05B 6/1263 219/623 |
| 2010/0000118 A1 | * | 1/2010 | Cunningham | .......... | D06F 58/20 34/487 |
| 2010/0102136 A1 | * | 4/2010 | Hadzidedic | .............. | F24F 11/77 236/49.3 |
| 2010/0106312 A1 | * | 4/2010 | Grohman | ................. | F24F 11/77 700/276 |
| 2010/0288468 A1 | * | 11/2010 | Patel | ..................... | B01D 46/10 165/59 |

(Continued)

*Primary Examiner* — Joseph H Feild
*Assistant Examiner* — Rufus C Point
(74) *Attorney, Agent, or Firm* — King & Spalding LLP

(57) ABSTRACT

A temperature control system includes a blower impeller assembly that has a blower impeller, a motor coupled to and configured to drive the blower impeller, and a sensor that is coupled to the motor and configured to measure current drawn by the motor to maintain the blower impeller at a set angular speed. Further, the temperature control system includes a controller that is communicatively coupled to the sensor. The controller electronically detects at least one of a blockage in a vent coupled to the temperature control system and a malfunction of the blower impeller based on an amount of the current drawn by the motor to maintain the blower impeller at the set angular speed.

18 Claims, 10 Drawing Sheets

(56) References Cited

U.S. PATENT DOCUMENTS

| | | | |
|---|---|---|---|
| 2013/0309958 A1* | 11/2013 | Bach | G05D 7/0682 |
| | | | 454/256 |
| 2014/0316594 A1* | 10/2014 | Steele | G05B 9/02 |
| | | | 700/291 |
| 2015/0152791 A1* | 6/2015 | White | F02C 9/26 |
| | | | 60/773 |
| 2015/0330861 A1 | 11/2015 | Alsaleem | |
| 2017/0343222 A1* | 11/2017 | Markert | F24F 1/0011 |
| 2018/0238577 A1* | 8/2018 | Drees | F24F 11/38 |
| 2018/0299155 A1* | 10/2018 | Walsh | F24F 11/38 |

* cited by examiner

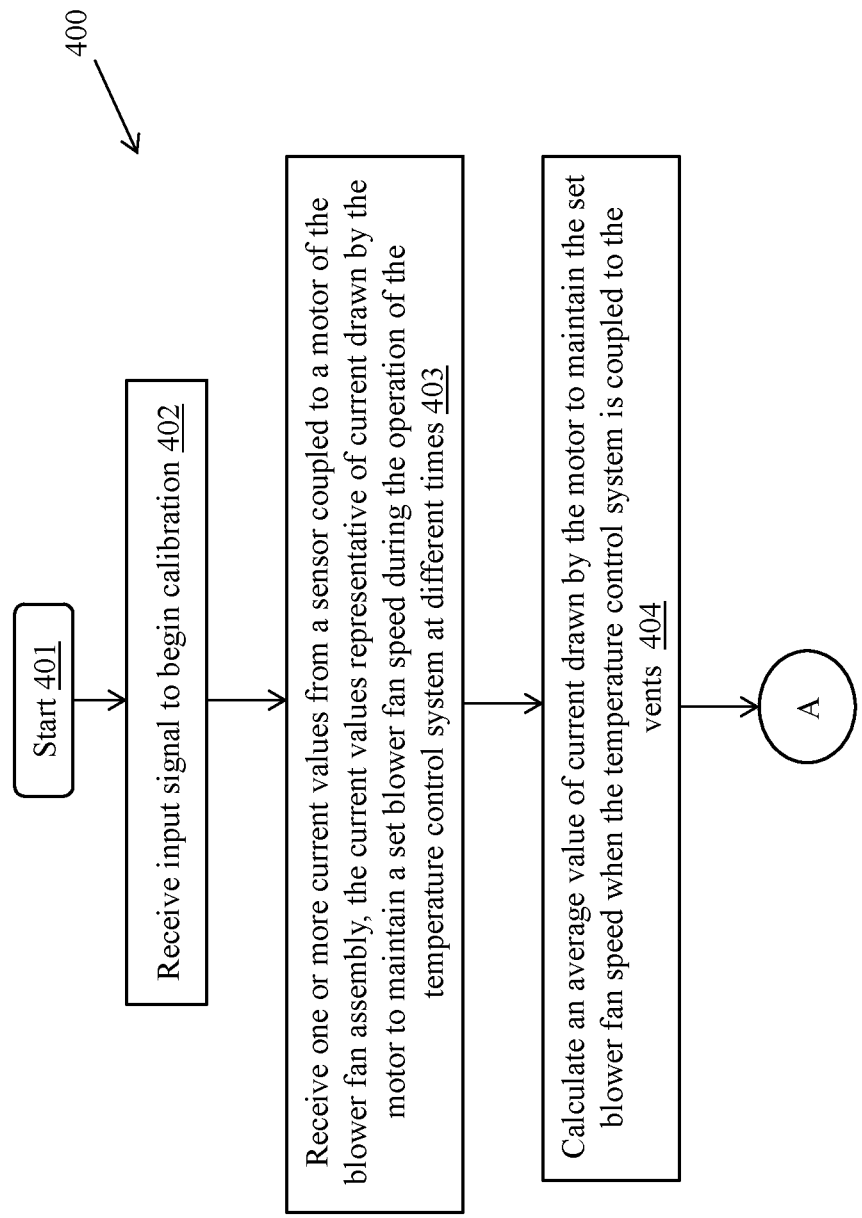

ELECTRONIC DETECTION OF VENT BLOCKAGE AND BLOWER MALFUNCTION IN TEMPERATURE CONTROL SYSTEMS

TECHNICAL FIELD

The present disclosure relates generally to temperature control systems, and more particularly to electronic detection of vent blockage and blower malfunction in temperature control systems.

BACKGROUND

Temperature control systems such as HVACs, water heaters, boilers, etc., typically include a blower impeller that is configured to create a movement of air (herein 'air flow') therethrough. For example, a temperature control system may include a forced draft fan that is configured to force air into the temperature control system to provide air for combustion or an induced draft fan that is configured to extract the air from the temperature control system through the heat exchangers post combustion and exhaust the air through a venting duct (vent) that may be coupled to the temperature control system. A change in air flow in the temperature control system due to a blockage in the vents, a blower impeller malfunction, etc., may create unstable, unsafe, and inefficient operating conditions in the temperature control system.

Conventional temperature control systems use pressure switches to detect said change in the air flow and responsively shut down the operation of the temperature control system when there is a threshold change in air flow to prevent any damage to the temperature control system and/or related consequences. For example, as illustrated in FIG. 1, an example water heater 100 may include three pressure switches (106, 108, and 112). Two of the pressure switches (106, 108) are disposed in the air intake vent 102 and the exhaust vent 104, respectively, and are used to detect vent blockage in the air intake vent 102 and the exhaust vent 104; while the third pressure switch 112 is disposed after the blower impeller 110 and before the heat exchanger 114 and is used to detect the presence and proper operation of the blower impeller 110. The pressure switches (106, 108, and 112) may be set to open and responsively shut down the water heater or end a heating cycle of the water heater when a specific threshold pressure for which the pressure switches (106, 108, and 112) are set is reached due to the change in airflow resulting from a vent blockage or blower impeller malfunction. Each time a temperature control system is shut down, it takes several minutes to recover and re-start the temperature control system which may be inconvenient and may negatively affect the efficiency of the temperature control system.

The pressure switches are not configured to detect and/or provide a warning regarding a condition of the temperature control system that is not critical, but causes inefficient operation and could lead to a shutdown of the temperature control system if the condition is left unaddressed. In other words, the pressure switches are not configured to warn a user regarding a condition that could lead to a shut down and provide the user an opportunity to address the condition, prevent the shutdown of the temperature control system, and/or to operate the temperature control system at a higher efficiency. Further, the pressure switches may add to the number of components and the cost of the temperature control system. Furthermore, the pressure switches may occupy space and inhibit a compact design of the temperature control system. For example, as illustrated in FIG. 1, the pressure switches (106, 108, and 112) may be attached external to the water heater using harnesses and may include pressure sensing tubes extending external to and from the side of the water heater, thereby preventing a compact design of the water heater.

It is noted that this background information is provided to reveal information believed by the applicant to be of possible relevance to the present disclosure. No admission is necessarily intended, nor should be construed, that any of the preceding information constitutes prior art against the present disclosure.

SUMMARY

In one aspect, a temperature control system of the present disclosure includes a blower impeller assembly that has a blower impeller that is configured to create an airflow through the temperature control system. The blower impeller assembly further includes a motor coupled to and configured to drive the blower impeller; and a sensor that is coupled to the motor and configured to measure current drawn by the motor to maintain the blower impeller at a set angular speed. Further, the temperature control system includes a controller that is communicatively coupled to the sensor and configured to electronically detect at least one of a blockage in a vent coupled to the temperature control system and a malfunction of the blower impeller based on an amount of the current drawn by the motor to maintain the blower impeller at the set angular speed, the vent having a given length. The amount of the current drawn by the motor is received as sensor data from the sensor.

In another aspect, a non-transitory computer-readable medium includes a plurality of instructions, which, when executed by a controller of a temperature control system, causes the controller to perform operations. The operations include receiving, from a sensor that is coupled to a motor that drives a blower impeller of the temperature control system, a sensor data comprising a current value that is representative of an amount of current drawn by the motor to maintain the blower impeller of the temperature control system at a set angular speed. Further, the operation includes detecting, based on the current value, at least one of a blockage in a vent coupled to the temperature control system and a malfunction of the blower impeller based on the amount of the current drawn by the motor to maintain the blower impeller at the set angular speed, the vent having a given length.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 4A-4B (collectively 'FIG. 4') are flowcharts that illustrate an example method of a calibration mode where a current value tolerance range of the temperature control system of FIG. 2 is set for a given vent length, in accordance with example embodiments of the present disclosure.

Figure 1:
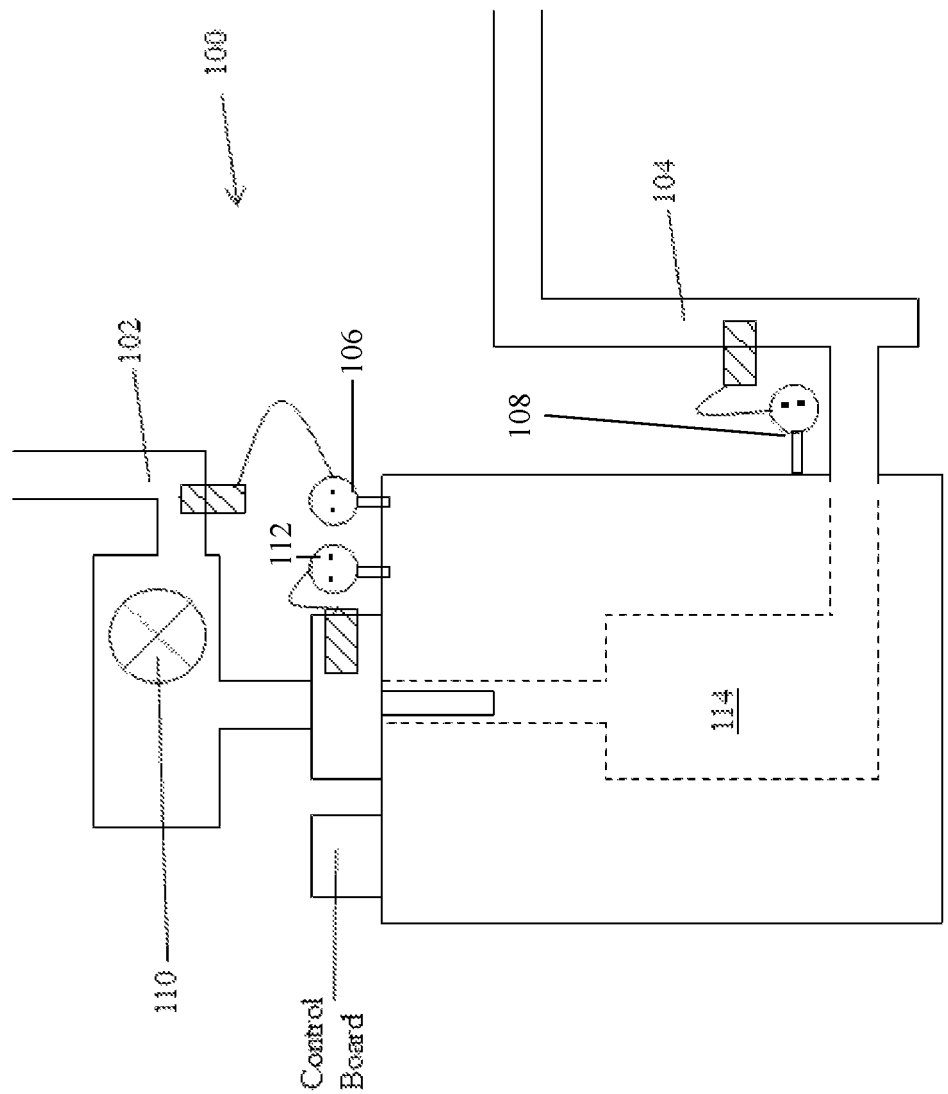
FIG. 1 is a schematic diagram of an example temperature control system with pressure switches, in accordance with a prior art temperature control system.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an example system, apparatus, and method for electronic detection of vent blockage and blower malfunction (herein 'electronic detection mechanism' or 'electronic detection system') in temperature control systems. The electronic detection mechanism is configured to remove and replace the existing pressure switches, thereby reducing the cost of the temperature control system and allowing a compact design of the temperature control system. Further, said electronic detection mechanism is configured to identify non-critical vent blockage conditions and provide a warning signal, which in turn provides an opportunity to address the vent blockage condition and prevent the shutdown of the temperature control system.

In one example, a temperature control system with the electronic detection mechanism includes a blower impeller assembly that is configured to create an airflow through the temperature control system. The blower impeller assembly operates in concert with a controller to maintain a blower impeller of the blower impeller assembly at a set angular speed (revolutions per minute (RPM)). The controller may be electrically and communicatively coupled to the blower impeller assembly to send control signals to and receive feedback signals from the blower impeller assembly. The blower impeller assembly further includes a motor that operates the blower impeller, and a sensor that is coupled to the motor and the controller. The sensor is configured to detect a current drawn by the motor of the blower impeller assembly to maintain the blower impeller at a set angular speed and transmit a current value representative of the current drawn by the motor to the controller.

On the basis of the current value that is received from the sensor, the controller determines whether: (a) the blower impeller is inoperative, (b) the blower impeller is locked, and (c) if the vents (intake and/or exhaust) are blocked. The term 'inoperative' as used herein in the context of the blower impeller may refer to a condition where the one or more blades of the blower impeller is either missing, not present, or broken. In the event that the controller determines a blower impeller malfunction, i.e., inoperative blower impeller or locked blower impeller, the controller generates and communicates a corresponding blower impeller malfunction error signal to a user; and shuts down the operation of the temperature control system. Shutting down an operation of the temperature control system may include a complete shut-down of the temperature control system or ending an ongoing operation cycle (e.g., heating or cooling cycle) of the temperature control system.

In the event that the controller determines a vent blockage, the controller determines whether the blockage is critical. If the blockage of the vent is not critical, then, the controller does not shut down the temperature control system. Instead, the controller generates and communicates a vent blockage warning signal to the user. The warning signal provides the user an opportunity to remove the blockage and resume an efficient operation of the temperature control system without having to shut down the temperature control system. However, if the vent blockage is determined to be critical, the controller shuts down the operation of the temperature control system.

In some examples, the controller is configured to generate different types of warning signals based on the criticality of the vent blockage. For example, if there is 20% blockage in the vent, the controller may generate a low level warning signal; but if the blockage is 45%, the controller may generate a high level.

Example embodiments of the temperature control system with the electronic detection mechanism of the present disclosure will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the temperature control system with the electronic detection mechanism of the present disclosure may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the present disclosure can be located in any type of environment (e.g., warehouse, attic, garage, storage, mechanical room, basement) for any type (e.g., commercial, residential, industrial) of user.

Turning now to the figures, example embodiments of a temperature control system with the electronic detection mechanism will be described in connection with FIGS. 2-5. In particular, example components of the temperature control system with the electronic detection mechanism will be described in connection with FIG. 2; and example operations of the electronic detection mechanism will be described in connection with FIGS. 3-5.

Before discussing the example embodiment directed to the temperature control system with the electronic detection mechanism, it may assist the reader to understand that the term 'temperature control system' as used herein may refer to any appropriate system or device such as, but not limited to, HVAC system, gas furnace, electric furnace, water heater, gas heater, boiler, etc., that is configured to change a temperature of air or water that is delivered to an end user. Further, the term 'normal operation' of the temperature control system may generally refer to an operation of the temperature control system when there are no faults or obstructions, such as vent blockage or blower malfunction.

Figure 2:
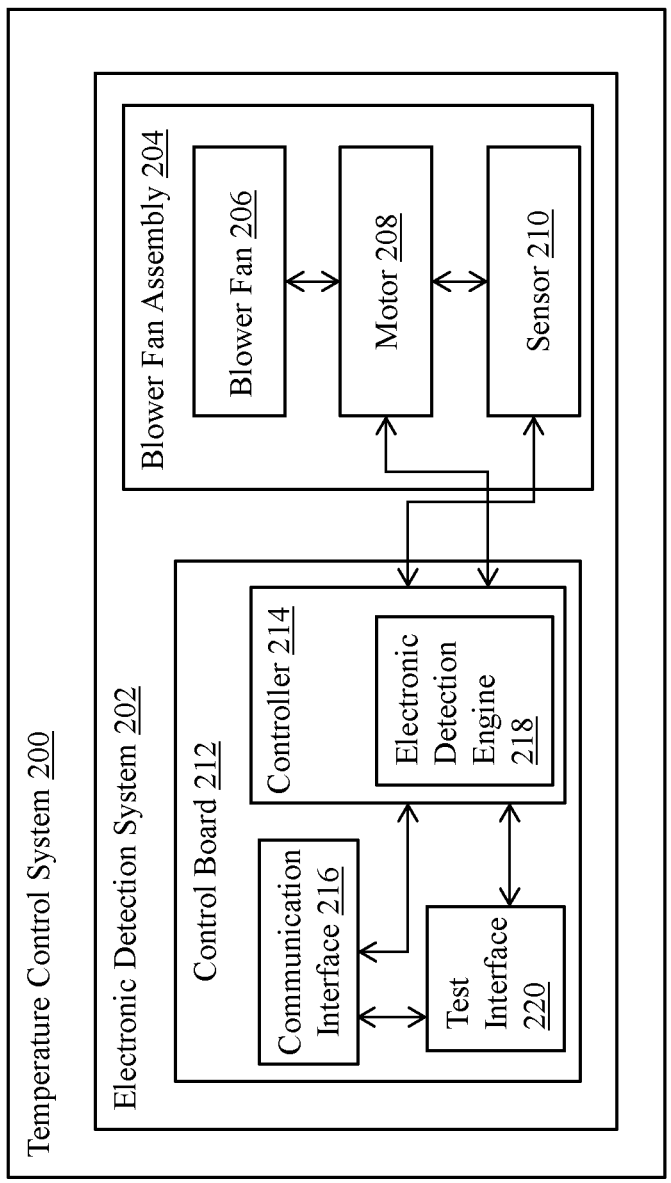
FIG. 2 is a block diagram of an example temperature control system having an electronic vent blockage and blower malfunction detection mechanism, in accordance with example embodiments of the present disclosure.

Further, before discussing the example embodiment directed to the temperature control system with the electronic detection mechanism, it is noted that well known components of the temperature control system, such as the heat exchanger 114, burner, etc., are omitted from FIG. 2 so as not to obscure the electronic detection mechanism of the temperature control system.

Referring to FIG. 2, an example temperature control system 200 may include an electronic detection system 202 that is configured to electronically detect a vent blockage and/or a blower malfunction that affects an airflow through the temperature control system 200. The temperature control system 200 may be coupled to an air intake vent 102 (shown in FIG. 1) through which air is drawn to provide air for combustion and/or a flue gas exhaust vent 104 (shown in FIG. 1) through which the post combustion air (flue gas) exits after it passes through the heat exchanger 114.

The electronic detection system 202 may include a blower impeller assembly 204 that is configured to create the airflow through the temperature control system 200. The blower impeller assembly 204 may include a blower impeller 206 such as a induced draft blower impeller or a forced air blower impeller. Further, the blower impeller assembly 204 may include a motor 208 (e.g., a DC motor) that is coupled to the blower impeller 206 and configured to drive the blower impeller 206. Furthermore, the blower impeller assembly 204 may include a sensor 210, such as a current sensor, that is coupled to the motor 208 and configured to determine the a current drawn by the motor 208 to maintain the blower impeller 206 at a set angular speed. The current drawn by the motor 208 to maintain the blower impeller 206 at the set angular speed may be interchangeably referred to as current drawn by the blower impeller 206 without departing from a broader scope of the present disclosure.

In addition to the blower impeller assembly, the electronic detection system 202 may include the control board 212 that is coupled to the blower impeller assembly 204. The control board 212 may be configured to control the operation of the blower impeller assembly 204 such that a blower impeller 206 of the blower impeller assembly 204 is maintained at the set angular speed (rpm). In particular, the control board 212 may include the controller 214 that is electrically and communicatively coupled to the motor 208 and the sensor 210 of the blower impeller assembly 204. The controller 214 is configured to receive sensor data from the sensor 210, where the sensor data comprises a current value representative of the current drawn by the motor 208 to maintain a set angular speed of the blower impeller 206. In some example embodiments, the sensor 210 may be configured to wirelessly transmit the sensor data to the controller 214. Further, the controller 214 is configured to analyze the sensor data and electronically detect a vent blockage or blower malfunction in the temperature control system 200 based on the current value provided in the sensor data. Furthermore, the controller is configured to send control signals to the motor 208 to maintain the blower impeller 206 at the set angular speed. In some example embodiments, the controller 214 may generate and transmit the control signals to the motor 208 based on a feedback signal received from a speed sensor (not shown in Figures) that may be coupled to the motor 208 and configured to measure the angular speed of the blower impeller 206.

In one example embodiment, the controller 214 may be a microcontroller; however, in other example embodiments, the controller 214 may include any suitable control mechanism that is capable of receiving sensor data, electronically detecting a vent blockage or blower malfunction in the temperature control system 200 based on the current value, and interacting and/or controlling other components of the electronic detection system such as the blower impeller assembly 204, the communication interface 216, etc. For example, the controller 214 may comprise any combination of analog and/or digital electronics.

In particular, the controller 214 may include an electronic detection engine 218 that may be implemented, in one embodiment, as a set of instructions (e.g., software programs) that can be executed by the controller 214 to perform operations associated with a calibration mode and the electronic detection mode of the temperature control system. The electronic detection engine 218 may be disposed in a memory associated with the controller 214 and may be executed by a processor of the controller 214. Alternatively, the electronic detection engine 218 (embodied as a set of instructions) may be downloaded and stored in the memory of the controller 214. However, in other example embodiments, the electronic detection engine 218 may be disposed external to the memory and may be implemented as an independent hardware element (e.g., electronic or electrical circuitry or devices) or as a combination of hardware and software programs. In some example embodiments, the electronic detection engine 218 may be embodied as a non-transitory computer-readable medium comprising a plurality of instructions that can be executed by the controller 214.

As illustrated in FIG. 2, the control board 212 may further include a test interface 220 that may be coupled to the controller 214 and is configured to send a calibration signal to the controller 214 to initiate a calibration process associated with the calibration mode. The test interface 220 may include a user interface, such as, but not limited to, a switch, a button, a display with keypad, etc., through which a user can interact with the temperature control system to send the calibration signal to the controller 214 and begin the calibration process. The calibration process may set or establish a current value tolerance range comprising a range of current values representative of the current drawn by the motor during a normal operation of the temperature control system for a given length of intake and exhaust vents. In some example embodiments, the calibration process may be automatically initiated when the temperature control system is coupled to the intake and/or exhaust vents. In said some example embodiments, the control board 212 may or may not include the test interface 220.

In some example embodiments, the temperature control system 200 may include a communication interface 216, such as a wireless communication interface, through which a user can send commands to the electronic detection system 202 from a remote location and/or the electronic detection system 202 can send signals or messages (e.g., warnings, error signals, etc.) to a computing device of a user.

Figure 3:
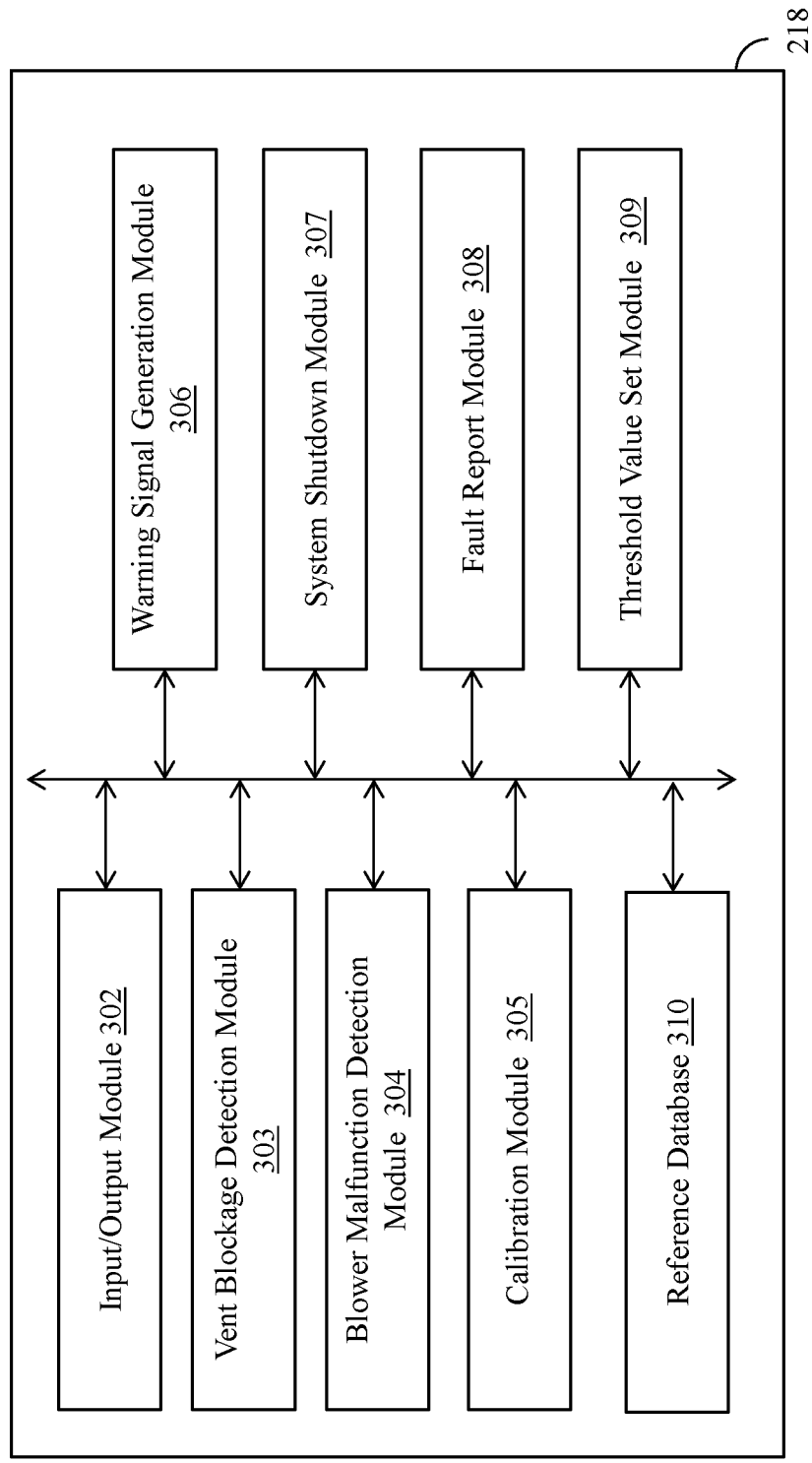
FIG. 3 illustrates an example electronic detection engine of the temperature control system of FIG. 2, in accordance with example embodiments of the present disclosure.
Figure 4B:
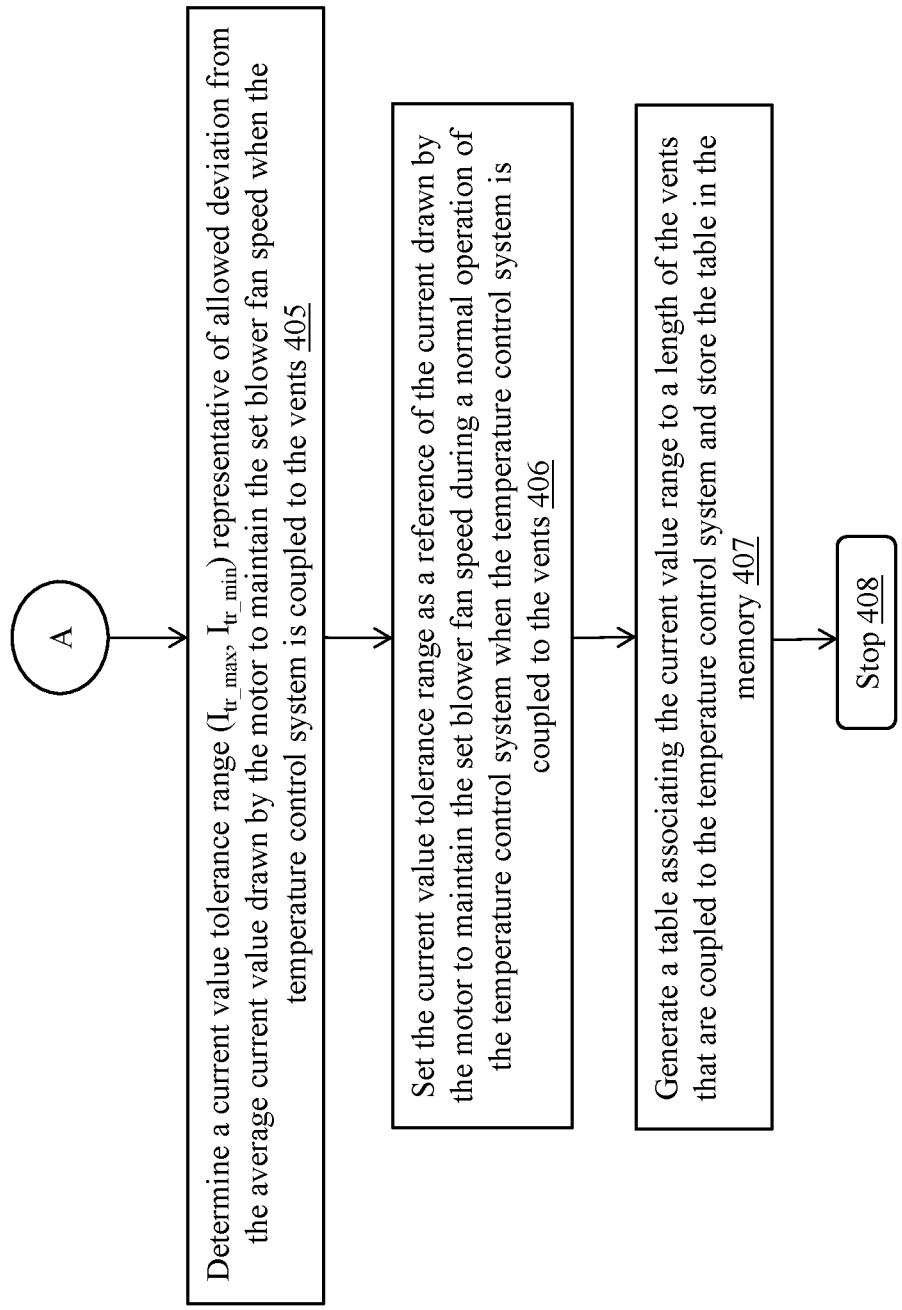
Figure 5A:
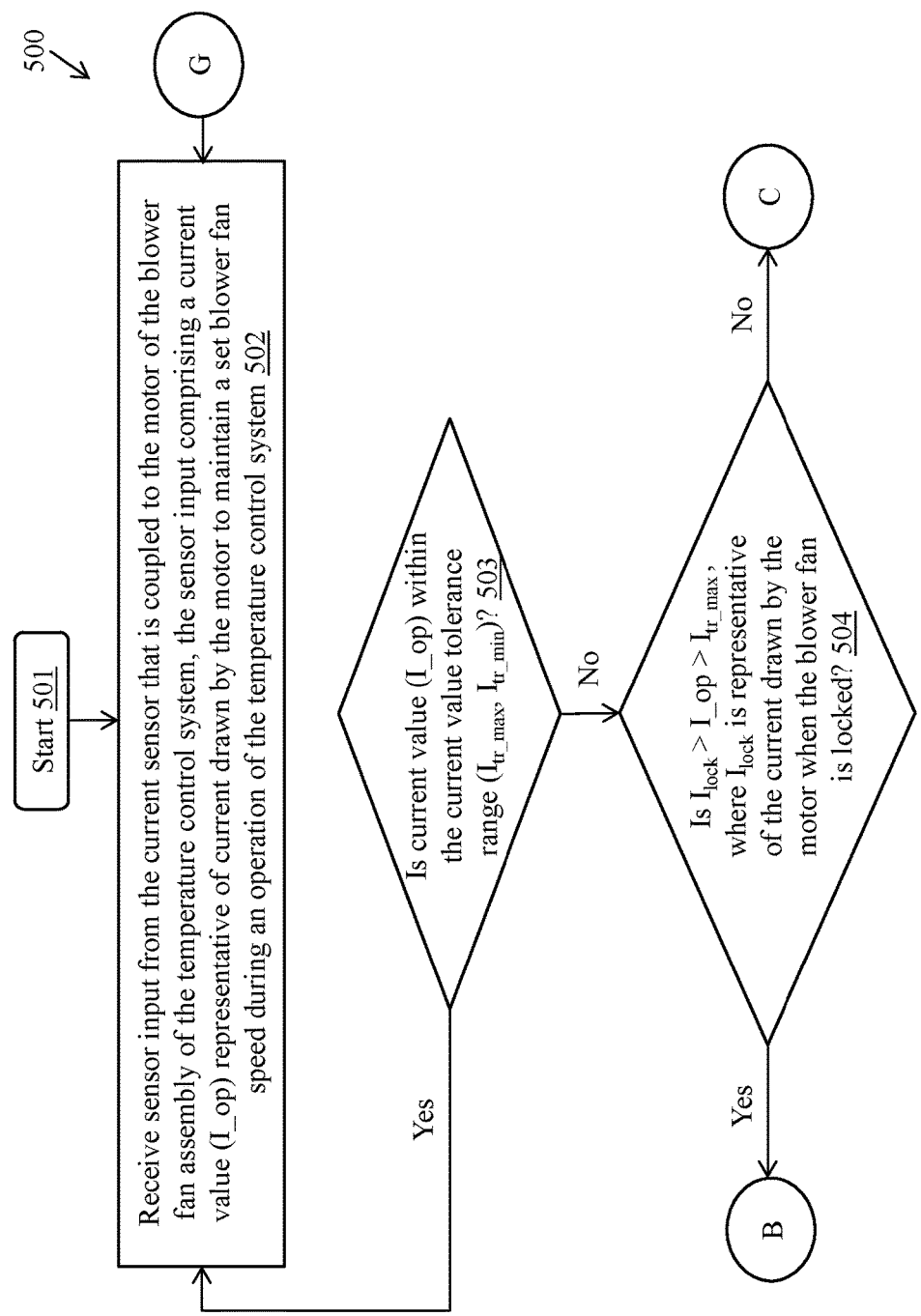
FIGS. 5A-5E (collectively 'FIG. 5') are flowcharts that illustrate an example method of detection mode where vent blockage and blower malfunction in the temperature control system of FIG. 2 is electronically determined, in accordance with example embodiments of the present disclosure.
Figure 5B:
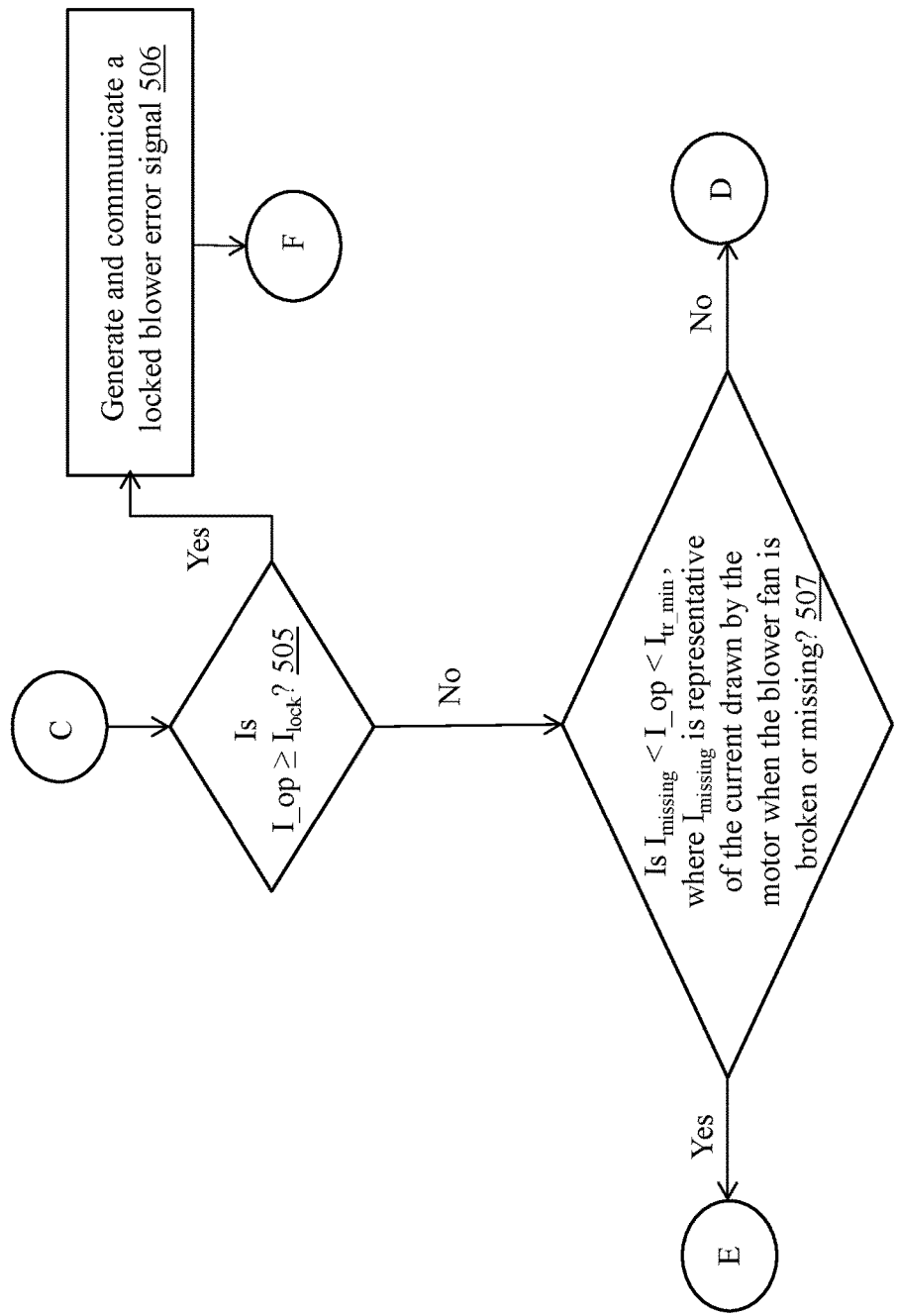
Figure 5C:
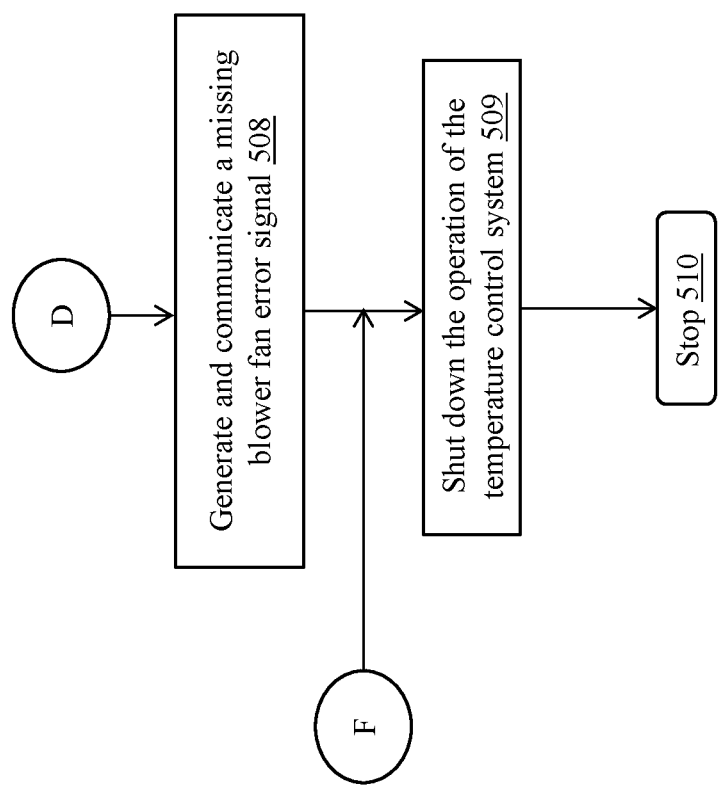
Figure 5D:
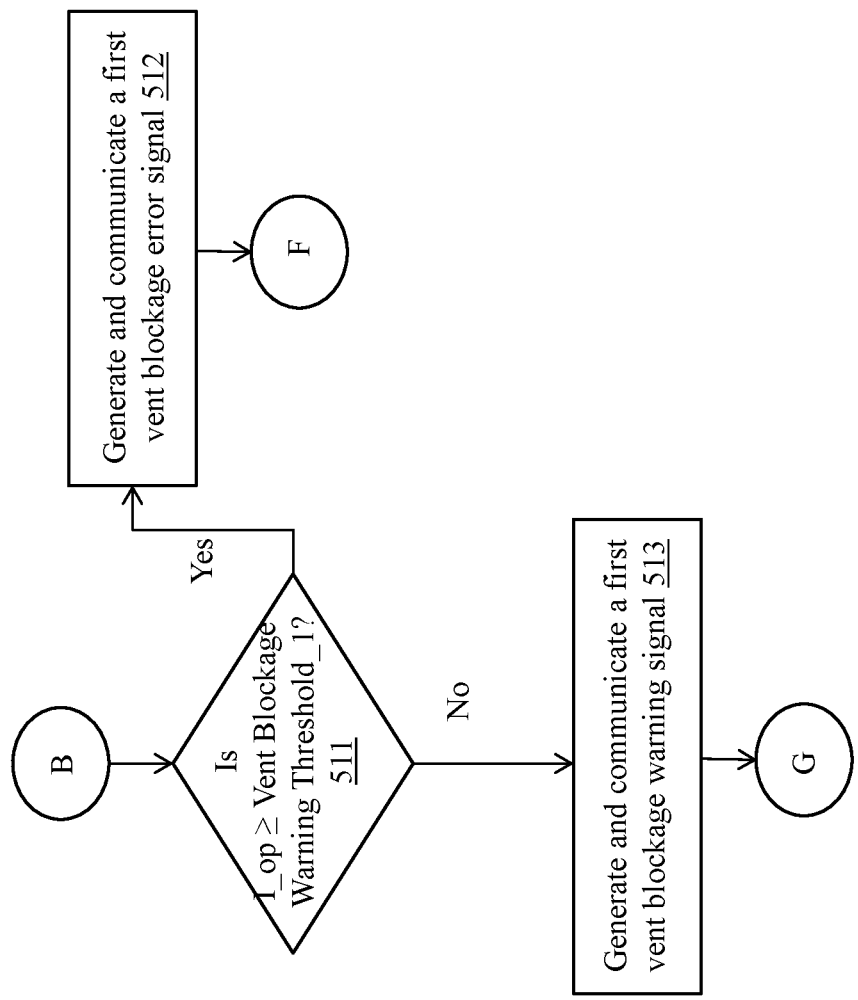
Figure 5E:
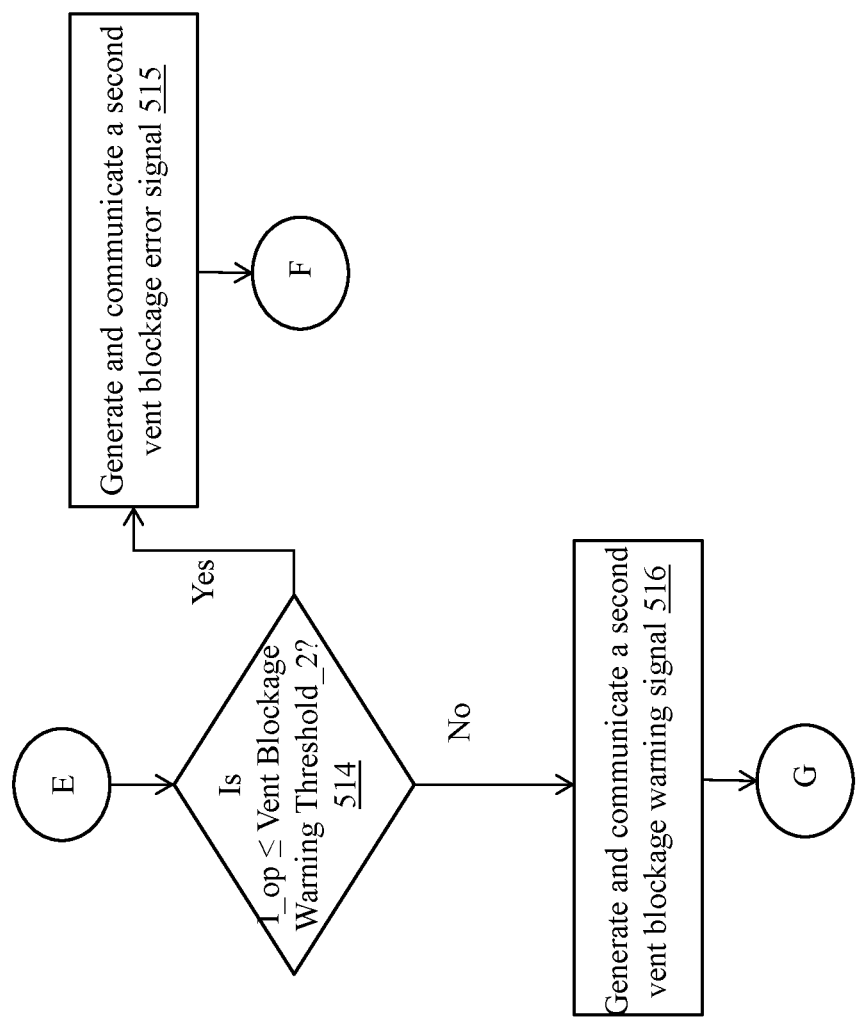

The operations of the electronic detection system 202 to set or establish a current value tolerance range in the calibration process, and to electronically detect vent blockages and blower malfunction in a temperature control system will be described below in greater detail in association with FIGS. 3-5. In particular, FIG. 4 illustrates an example method 400 of a calibration mode; and FIG. 5 illustrates an example method 500 of electronically detecting vent blockage and blower malfunction in the temperature control system. FIGS. 4-5 will be described in view of and by making reference to FIG. 3 as needed.

Although specific operations of the electronic detection system 202 are disclosed in the flowcharts illustrated in FIGS. 4-5, such operations are only non-limiting examples. That is, embodiments of the present invention are well suited to performing various other operations or variations of the operations recited in the flowcharts. It is appreciated that the operations in the flowcharts illustrated in FIGS. 4-5 may be performed in an order different than presented, and that not all of the operations in the flowcharts may be performed.

All, or a portion of, the embodiments described by the flowcharts illustrated in FIGS. 4-5 can be implemented using the electronic detection engine 218 which resides, for example, in computer-usable media of a computer system, a memory of the temperature control system 200, or like device.

Turning to FIG. 4, the calibration process 400 begins at step 401 and proceeds to step 402 where an input/output module 302 of the controller 214 may receive a calibration input signal from the test interface 220. In one example embodiment, the test interface 220 may be directly accessed by an end user to begin a calibration process. For example, an end user may press a button on the temperature control system to initiate the calibration process. However, in other example embodiments, the test interface 220 may be remotely accessed using a computing device that is communicatively coupled to the temperature control system 200 via a wireless communication network to begin the calibration process. For example, a technician can send a signal via the technician's smart phone to the temperature control system to initiate the calibration process.

In either case, responsive to receiving the calibration input signal, in step 403, the input/output module 302 may transmit the calibration input signal to the calibration module 305. In step 403, the calibration module 305 of the controller 214 may operate in concert with the sensor 210 of the blower impeller assembly 204 to retrieve sensor data from the sensor 210 that is coupled to the motor 208 of the blower impeller assembly 204. In particular, responsive to receiving the calibration signal, the calibration module 305 may send a request to the sensor 210 to receive the sensor data. The sensor data may comprise a current value representative of current drawn by the motor 208 to maintain the blower impeller 206 at a set angular speed. In some example embodiments, the sensor data may include more than one current value measured at different times. For example, the sensor data may include three current values measured at five second intervals. If the temperature control system 200 is switched off, the controller 214 may be configured to switch on the temperature control system 200 and provide a delay time to bring the temperature control system to equilibrium prior to retrieving the sensor data from the sensor 210 of the blower impeller assembly 204.

Upon receiving the sensor data, in step 404, the calibration module 305 may operate in concert with the threshold value set module 309 to calculate an average current value (I_avg) of the current drawn by the motor 210 of the blower impeller assembly 204 during a normal operation of the temperature control system 200 to maintain the blower impeller 206 at a set angular speed for a given length of the intake and/or exhaust vents (102, 104) to which the temperature control system 200 is coupled. The average current value (I_avg) may be calculated based on the sensor data. Then, in steps 405 and 406, threshold value set module 309 may determine and set a current value tolerance range ($I_{tr\_max}$–$I_{tr\_min}$) based on the average current value (I_avg) and an allowed deviation from the average current value. The allowed deviation percentage may be set by the manufacturer of the temperature control system 200 and may be stored in a memory of the controller 214.

Once the current value tolerance range for a given vent length is determined and set, in step 407, the threshold value set module 309 may store the current value tolerance range in a reference table in the reference database 310, where the table associates current value tolerance ranges to vent length of the vents that are coupled to the temperature control system 200. Then, the process 400 may end at operation 408.

In some example embodiments, the calibration process, i.e., steps 402-407 may be repeated for different vent lengths and the current value tolerance range for each vent length may be stored in the reference database table for use as a reference, e.g., to determine a vent blockage condition.

The calibration process determines and establishes the current drawn by the motor 208 of the blower impeller assembly 204 and an allowed deviation of the current (current value tolerance range) during a normal operation of the temperature control system 200 to maintain the blower impeller 206 at a set angular speed for a given length of vents (intake and exhaust) (herein 'vent length') to which the temperature control system 200 is coupled. For example, a temperature control system, such as a gas water heater may be coupled to an intake vent 102 and an exhaust vent 104, each vent being 45 feet long. In said example, the calibration process may be initiated to determine a current value tolerance range that is representative of the current drawn and an allowed deviation of the current drawn by the motor 208 of the blower impeller assembly 204 during a normal operation of the temperature control system 200 to maintain the blower impeller 206 at a set angular speed of 5000 rpm when the temperature control system 200 is coupled to a 45 ft intake and/or exhaust vent. In said example, if the current drawn by the motor 208 to maintain the blower impeller 206 at 5000 rpm during a normal operation of the temperature control system is 0.45 A; and approximately 11-12% deviation or tolerance is allowed, the current value tolerance range may be established as approximately 0.4 A-0.5 A for an intake and/or exhaust vent length of 45 ft. The current value tolerance range may vary with a change in the length of the vents (intake and/or exhaust vents) to which the temperature control system 200 is coupled. Accordingly, each time a new vent of a different length is coupled to the temperature control system 200, the controller 214 may repeat the calibration process automatically or based on a user request to determine and establish the current value tolerance range for the new length of the vents to which the temperature control system 200 is coupled.

In one example embodiment, the calibration process may be executed at a location at which the temperature control system 200 is installed once the temperature control system 200 has been coupled to the intake and/or exhaust vents. However, in other example embodiments, the calibration process may be executed at the factory for vents of different lengths. The results of the calibration process, i.e., current value tolerance ranges, for the different vent lengths may be stored in the reference table associated with the reference database 310 of the controller 214 as a reference for electronic detection of vent blockages.

In addition to establishing and storing the current value tolerance ranges of the motor 208 of the temperature control system 200 for the different vent lengths, in one or more example embodiments, the current values representative of the current drawn by the motor 208 to maintain the blower impeller 206 at a set angular speed when the blower impeller 206 is inoperative, e.g., impeller blades broken or missing ($I_{missing}$); and when the blower impeller 206 is locked ($I_{lock}$) may also be stored in the reference database 310 for use as a reference for electronic detection of blower malfunction.

Turning to FIG. 5, the process 500 of electronically detecting vent blockage and blower malfunction in the temperature control system 200 includes tracking, by a controller 214, the current drawn by the motor 208 of the blower impeller assembly 204 to maintain the blower impeller 206 at a desired or set angular speed. Further, based on the value of the current drawn (in amps), the controller 214 may determine: (a) if the blower impeller 206 is inoperative, (b) if the blower impeller is locked, or (c) if there is any blockage in the vents (102 and/or 104) coupled to the temperature control system 200. In the event of an inoperative blower impeller 206, the value of current drawn by the motor 208 may go down from the normal operating current value, because there is low load on the motor 208 controlling the angular speed of the blower impeller 206 to maintain a set angular speed. When the current drawn by the motor 208 equals or is lesser than the value of current drawn by the motor 208 when the blower impeller is inoperative, the controller 214 may generate and communicate a missing blower impeller error signal, and shut down the operation of the temperature control system 200. In the event of a locked blower impeller 206, the value of current drawn by the motor 208 may increase from the normal operating current value, because there is high load on the motor 208 controlling the angular speed of the blower impeller 206 to maintain the set angular speed. When the current drawn by the motor 208 equals or is greater than the value of current drawn by the motor 208 when the blower impeller is locked, the controller 214 may generate and communicate a locked blower impeller error signal, and shut down the operation of the temperature control system 200.

When the temperature control system 200 is being installed, after the vent lengths on both intake an exhaust vents (102, 104) are set, an installer or the end user may start the calibration process and the current value and an allowed deviation of the current value drawn by the blower impeller 206 for the given vent length will be set in a memory of the control board, e.g., reference database 310 as a reference for the amount of current drawn by the blower impeller 206 during a normal operation of the temperature control system for that particular vent setup. The current value drawn by the blower impeller 206 and the deviation may be established as a current value tolerance range for a given vent length, where the current value tolerance range may be indicative of current drawn by the motor to maintain the set angular speed during a normal operation of the temperature control system 200 for the given vent length.

In the event of a vent blockage, the current drawn by the blower impeller 206 may be outside the current value tolerance range. Accordingly, when the current drawn by the blower impeller 206 is outside of current value tolerance range, the controller 214 will recognize this change in current value as a blockage in venting. If the value of the current drawn is outside of the current value tolerance range but does not meet a shutdown condition, then, the controller 214 may generate and communicate a warning signal to the end user to indicate a non-critical vent blockage condition. However, if the value of the current drawn by the blower impeller 206 meet the shutdown threshold condition, the controller 214 may shut down the operation of the temperature control system 200.

As illustrated in FIG. 5, the process 500 may begin at step 501 and proceed to operation 502 where the input/output module 302 of the controller 314 may receive sensor data from the sensor 210 of the blower impeller assembly 204. In one example embodiment, the sensor 210 may be configured to transmit sensor data to the controller 214 periodically or at set time intervals. However, in other example embodiments, the sensor 210 may be configured to transmit sensor data to the controller 214 responsive to receiving a request from the controller 214. The sensor data may include the current value (I_op) that is representative of the current drawn by the motor 210 of the blower impeller assembly 204 to maintain the blower impeller 206 of the blower impeller assembly 204 at a set angular speed.

Upon receiving the sensor data comprising the current value (I_op), in step 503, the input/output module 302 of the controller 214 may transmit the current value (I_op) to the vent blockage detection module 303 of the controller 214. Further, in step 503, the vent blockage detection module 303 determines if the received current value (I_op) is within the current value tolerance range ($I_{tr\_max}$–$I_{tr\_min}$), i.e., $I_{tr\_max}$>I_op>$I_{tr\_min}$ or $I_{tr\_max}$<I_Op<$I_{tr\_min}$.

If the received current value (I_op) is within the current value tolerance range ($I_{tr\_max}$–$I_{tr\_min}$), then, the controller 214 determines that there are no detectable vent blockages and blower malfunction. Accordingly, upon determining that the received current value (I_op) is within the current value tolerance range ($I_{tr\_max}$–$I_{tr\_min}$), the process 500 returns to step 502 where the temperature control system 200 continues its operation and the controller 214 continues to monitor the sensor data to detect vent blockage or blower malfunction conditions.

However, in step 503, if the vent blockage detection module 303 of the controller 214 determines that the received current value (I_op) is outside the current value tolerance range ($I_{tr\_max}$–$I_{tr\_min}$), then the process 500 proceeds to step 504 where the vent blockage detection module 303 of the controller 214 determines whether the received current value (I_op) is greater than the upper limit ($I_{tr\_max}$) of the current value tolerance range ($I_{tr\_max}$–$I_{tr\_min}$) but is less than the current drawn by the motor 208 when the blower impeller 206 is locked ($I_{lock}$), i.e., $I_{lock}$>I_op>$I_{tr\_max}$.

If the controller 214 determines that the received current value (I_op) is greater than the upper limit ($I_{tr\_max}$) of the current value tolerance range ($I_{tr\_max}$–$I_{tr\_min}$) but is less than the current drawn by the motor 208 when the blower impeller 206 is locked ($I_{lock}$), then, the process 500 proceeds to step 511 where the vent blockage detection module 303 determines whether the received current value (I_op) is greater than or equal to a first vent blockage warning threshold. If the received current value (I_op) is greater than or equal to a first vent blockage warning threshold, then in step 512, the vent blockage detection module 303 may operate in concert with the fault report module 308 of the controller 214 and the communication interface 216 of the temperature control system 202 to generate a first vent blockage error signal and communicate the first vent blockage error signal to an end user. In one example embodiment, any error or warning signals may be communicated through a display and/or audio interface associated with the temperature control system 200 as a scrolling message, flashing LEDs, speakers, etc. However, in other example embodiments, any error or warning signals may be wirelessly communicated to a computing device of the end user, or by any other appropriate communication mechanisms. The vent blockage error signal may be configured to alert an end user regarding a vent blockage condition.

Once the vent blockage error signal is communicated, the process 500 proceeds to step 509 where the system shutdown module 307 of the controller 214 may shut down the operation of the temperature control system 200 in response to the vent blockage condition.

However, in step 511, if the vent blockage detection module 303 determines that received current value (I_op) is lesser than or equal to a first vent blockage warning threshold but is still greater than upper limit ($I_{tr\_max}$) of the current value tolerance range ($I_{tr\_max}$-$I_{tr\_min}$), then in step 513, the vent blockage detection module 303 may operate in concert with the warning signal generation module 306 of the controller 214 to generate and communicate a first warning signal to the end user. Responsive to communicating the first warning signal to the end user, the process 500 may return to operation 502 where the temperature control system 200 continues its operation without shutting down and the controller 214 continues to monitor the sensor data.

Returning to step 504, upon a negative determination that the received current value (I_op) is greater than the upper limit ($I_{tr\_max}$) of the current value tolerance range ($I_{tr\_max}$-$I_{tr\_min}$) and less than the current drawn by the motor 208 when the blower impeller 206 is locked ($I_{lock}$), the process 500 proceeds to step 505 where the vent blockage detection module 303 transmits the received current value (I_op) to the blower malfunction detection module 304 to determine if the received current value (I_op) is greater than or equal to the current drawn by the motor 208 when the blower impeller 206 is locked ($I_{lock}$). If the received current value (I_op) is greater than or equal to the current drawn by the motor 208 when the blower impeller 206 is locked ($I_{lock}$), then, in step 506, the blower malfunction detection module 304 may operate in concert with the fault report module 308 of the controller 214 and the communication interface 216 temperature control system 202 to generate and communicate a locked blower error signal to an end user. Responsive to generating and communication the locked blower error signal, in step 509 the blower malfunction detection module 304 may operate in concert with the system shutdown module 307 of the controller 214 to shut down the operation of the temperature control system 200 in response to the blower malfunction condition.

In step 505, if the controller 214 determines that the received current value (I_op) is not greater than or equal to the current drawn by the motor 208 when the blower impeller 206 is locked ($I_{lock}$), then, the process 500 proceeds to step 507 where the vent blockage detection module 303 of the controller 214 may determine whether the received current value (I_op) is lesser than the lower limit ($I_{tr\_min}$) of the current value tolerance range ($I_{tr\_max}$-$I_{tr\_min}$) but is greater than the current drawn by the motor 208 when the blower impeller 206 is inoperative ($I_{missing}$), i.e., $I_{tr\_min}$>I_Op>$I_{missing}$.

If the controller determines that the received current value (I_op) is lesser than the upper limit ($I_{tr\_min}$) of the current value tolerance range ($I_{tr\_max}$-$I_{tr\_min}$) but is greater than the current drawn by the motor 208 when the blower impeller 206 is inoperative ($I_{missing}$), then, the process 500 proceeds to step 514 where the vent blockage detection module 303 determines whether the received current value (I_op) is less than or equal to a second vent blockage warning threshold.

If the received current value (I_op) is less than or equal to a second vent blockage warning threshold, then in step 515, the vent blockage detection module 303 may operate in concert with the fault report module 308 of the controller 214 and the communication interface 216 of the temperature control system 202 to generate a second vent blockage error signal and communicate the second vent blockage error signal to an end user. The second vent blockage error signal may be configured to alert an end user regarding a vent blockage condition.

Once the vent blockage error signal is communicated, the process 500 proceeds to step 509 where the system shutdown module 307 of the controller 214 may shut down the operation of the temperature control system 200 in response to the vent blockage condition.

However, in step 514, if the vent blockage detection module 303 determines that received current value (I_op) is greater than or equal to a second vent blockage warning threshold but is still lesser than lower limit ($I_{tr\_min}$) of the current value tolerance range ($I_{tr\_max}$-$I_{tr\_min}$), then in step 516, the vent blockage detection module 303 may operate in concert with the warning signal generation module 306 of the controller 214 to generate and communicate a second warning signal to the end user. Responsive to communicating the second warning signal to the end user, the process 500 may return to operation 502 where the temperature control system 200 continues its operation without shutting down and the controller 214 continues to monitor the sensor data.

The first and/or second warning signals may be configured to warn the end user regarding a vent blockage condition that is not critical, but may cause inefficient operation of the temperature control system 200 and could lead to a shutdown of the temperature control system 200 if the condition is left unaddressed. The warning signal provides the end user an opportunity to address and fix the vent blockage condition without having to shut down the temperature control system 200.

Returning to step 507, upon a negative determination that the received current value (I_op) is lesser than the lower limit ($I_{tr\_min}$) of the current value tolerance range ($I_{tr\_max}$-$I_{tr\_min}$) and greater than the current drawn by the motor 208 when the blower impeller 206 is inoperative ($I_{missing}$) then, the process 500 proceeds to step 508 where the blower malfunction detection module 304 may operate in concert with the fault report module 308 of the controller 214 and the communication interface 216 of the temperature control system 200 to generate and communicate a missing blower error signal to an end user. Responsive to generating and communication the missing blower error signal, in step 509 the blower malfunction detection module 304 may operate in concert with the system shutdown module 307 of the controller 214 to shut down the operation of the temperature control system 200 in response to the blower malfunction condition. Then, the process 500 ends at step 510.

Even though the present disclosure describes the various condition check steps of process 500, e.g., steps 503, 504, 505, 507, 511, and 514 as being executed sequentially, in other example embodiments, the various steps of the process 500 including the condition check steps may be executed in a different sequence or in parallel using multiple processors or controllers to increase a processing speed of the controller and provide a faster vent blockage or blower malfunction detection without departing from a broader scope of the present disclosure. Further, even though the present disclosure describes only one level and/or type of warning signal, in other example embodiments, the controller 214 may be configured to generate different levels of warning signals based on different thresholds that may be set either by a user or the manufacturer of the temperature control system 200. For example, some warning signals may be of a higher priority than the other warning signals.

In one example, the temperature control system may include a premix water heater such as the one illustrated in FIG. 1. However, unlike in FIG. 1 where the premix water heater includes pressure switches, in said example, the premix water heater may include the electronic detection system 202 that is configured to track the amount of current drawn by the motor 208 of the blower impeller 206 to electronically detect a vent blockage or blower malfunction. In said example embodiment, the premix water heater may be coupled to an intake vent that is 20 ft long and an exhaust vent that is 20 ft long, and the angular speed at which the blower impeller is to be maintained is 5000 rpm. Further, in said example, the amount of current drawn by the motor 208 when the blower impeller 206 is inoperative is 0.1 A and the amount of current drawn by the motor 208 when the blower impeller 206 is locked is 0.9 A. Furthermore, in said example, the current value tolerance range that provides the amount of current drawn by the motor 208 along with an allowed deviation to maintain the blower impeller 206 at 5000 rpm with the 20 ft intake vent and 20 ft exhaust vent is 0.4 A-0.5 A. The current drawn by the motor 208 when the blower impeller 206 is inoperative, the current drawn by the motor 208 when the blower impeller 206 is locked, and the current value tolerance range may be determined and stored in a memory of the controller 214 of the premix water heater. Said current values may be determined by tests conducted at the factory or after installation at the field through the calibration process or any other appropriate mechanism. In addition to determining the current value tolerance range of the premix water heater with the 20 ft intake vent and 20 ft exhaust vent, the electronic detection system 202 may also determine and store current value tolerance ranges for different intake and exhaust vent lengths, e.g., 0.3 A-0.4 A for 15 ft intake vent and 15 ft exhaust vent; 0.6 A-0.7 A for 45 ft intake vent and 30 ft exhaust vent, etc.

In said example, during operation of the premix water heater, the controller 214 of the electronic detection system 202 tracks the current drawn by the motor 208 to maintain the blower impeller 206 at 5000 rpm. In particular, the controller 214 receives sensor data comprising a current value representative of the current drawn by the motor 208. In said example, the current value is 0.4 A. Responsive to receiving the current value, the controller 214 determines whether the current value is within the current value tolerance range for the given vent lengths, i.e., 20 ft intake vent and 20 ft exhaust vent. In said example, the current value 0.4 A is within the current value tolerance range of 0.4 A-0.5 A. Accordingly, the controller 214 determines that there may not be any detectable vent blockage or blower malfunction, and continues to monitor the current drawn by the motor 208.

However, if the current value is 0.01 A, the controller 214 determines that the current value is below the amount of current drawn by the motor 214 when the blower impeller 206 is inoperative (or missing). Alternatively, if the current value is 1.2 A, the controller 214 determines that the current value is greater than the threshold current value representative of the amount of current drawn by the motor 214 when the blower impeller 206 is locked. In either case, the controller 214 detects a blower malfunction condition and will generate a corresponding error signal that indicates that either the blower impeller 206 is inoperative or the blower impeller 206 is locked based on the type of blower malfunction that is detected. Further, the controller 214 transmits or communicates the error signal to an end user either through a user interface (display screen, speakers, etc.) on the premix water heater or the error signal may be transmitted to a remotely located computing or receiving device via a communication interface (wireless or wired network interface) of the premix water heater. Furthermore, the controller 214 shuts down the operation of the premix water heater, e.g., either the whole water heater or the ongoing heating cycle of the water heater.

If the current value is outside the current value tolerance range of 0.4 A-0.5 A, but above the amount of current the amount of current drawn by the motor 214 when the blower impeller 206 is inoperative and below the amount of current drawn by the motor 214 when the blower impeller 206 is locked, the controller 214 detects that there is a vent blockage condition. For example, if the current value is 0.3 A, then, the controller 214 determines that there is a vent blockage. Since 0.3 A is within the current value tolerance range of 0.3 A-0.4 A for 15 ft intake vent and 15 ft exhaust vent, the controller 214 may determine that vents are blocked to an extent that the premix water heater is operating as if it is coupled to a 15 ft intake vent and 15 ft exhaust vent instead of the 20 ft intake vent and 20 ft exhaust vent. In said example, 0.2 A may be set as the warning threshold. Accordingly, the controller 214 may determine that said vent blockage is not critical and the controller 214 may generate and transmit a vent blockage warning signal without shutting down the premix water heater. The warning signal provides the end user to address and fix the non-critical vent blockage condition without having to shut down the operation of the water heater.

However, if the current value is 0.16 A which is below the warning threshold, the controller 214 determines that the vent blockage is critical. Accordingly, the controller 214 generates and transmits a vent blockage error signal. Further, the controller 214 may shut down the water heater. In some examples, the controller 214 is configured to generate warning signals of different priority. For example, if the current value is 0.21 A which is closer to the warning threshold, the controller 214 may generate a warning signal of higher priority as compared to when the current value is 0.3 A. The priority of the warning signals may be presented to an end user in any appropriate manner, e.g., different color coding of the displayed warning, different audio pattern, etc., without departing from a broader scope of the present disclosure.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A temperature control system comprising:
   a blower impeller assembly comprising:
      a blower impeller that is configured to create an airflow through the temperature control system;

a motor coupled to and configured to drive the blower impeller; and a sensor that is coupled to the motor and configured to measure a current drawn by the motor to maintain the blower impeller at a set angular speed; and a controller that is communicatively coupled to the sensor and configured to:

receive, from the sensor, sensor data to electronically detect based on the sensor data at least one of a blockage in a vent coupled to the temperature control system and a malfunction of the blower impeller, the sensor data comprising an amount of the current drawn by the motor to maintain the blower impeller at the set angular speed, the vent having a given length;

determine whether the amount of the current drawn by the motor is within a current value tolerance range associated with an average amount of current drawn by the motor to maintain the blower impeller at the set angular speed during a normal operation of the temperature control system for the given length of the vent; and responsive to a negative determination that the amount of the current drawn by the motor is within the current value tolerance range, determine whether the amount of the current drawn by the motor is less than a blower impeller locked value and greater than a blower impeller missing value, wherein the blower impeller locked value is representative of a first amount of current drawn by the motor to maintain the blower impeller at the set angular speed when the blower impeller is locked, and wherein the blower impeller missing value is representative of a second amount of current drawn by the motor to maintain the blower impeller at the set angular speed when the blower impeller is inoperative.

2. The temperature control system of claim 1, wherein the malfunction of the blower impeller comprises the blower impeller being locked.

3. The temperature control system of claim 1, wherein the malfunction of the blower impeller comprises the blower impeller being inoperative.

4. The temperature control system of claim 1, wherein the vent comprises at least one of an intake vent and an exhaust vent.

5. The temperature control system of claim 1, wherein the controller is configured to shut down the temperature control system responsive to detecting the malfunction of the blower impeller.

6. The temperature control system of claim 1, wherein the controller is configured to generate and transmit an error signal responsive to detecting at least one of the blockage in the vent and the malfunction of the blower impeller.

7. The temperature control system of claim 1, wherein the controller is configured to generate and transmit a warning signal responsive to determining that the blockage in the vent is not critical.

8. The temperature control system of claim 1, wherein responsive to a negative determination that the amount of the current drawn by the motor is within the current value tolerance range and a positive determination that the amount of the current drawn by the motor is less than the blower impeller locked value and greater than the blower impeller missing value, the controller detects that there is the blockage in the vent.

9. The temperature control system of claim 2, wherein the controller detects that the blower impeller is locked when the amount of the current drawn by the motor to maintain the blower impeller at the set angular speed is greater than or equal to the blower impeller locked value.

10. The temperature control system of claim 3, wherein the controller detects that the blower impeller is inoperative when the amount of the current drawn by the motor to maintain the blower impeller at the set angular speed is less than or equal to the blower impeller missing value.

11. A non-transitory computer-readable medium comprising a plurality of instructions, which, when executed by a controller of a temperature control system, causes the controller to perform operations comprising:

receiving, from a sensor that is coupled to a motor that drives a blower impeller of the temperature control system, a sensor data comprising a current value that is representative of an amount of current drawn by the motor to maintain the blower impeller of the temperature control system at a set angular speed;

detecting, based on the current value, at least one of a blockage in a vent coupled to the temperature control system and a malfunction of the blower impeller, the current value based on the amount of the current drawn by the motor to maintain the blower impeller at the set angular speed, the vent having a given length; and determining that: (a) the current value is within a current value tolerance range associated with an average amount of current drawn by the motor to maintain the blower impeller at the set angular speed during a normal operation of the temperature control system for the given length of the vent, and (b) the current value is less than a blower impeller locked value and greater than a blower impeller missing value, wherein the blower impeller locked value is representative of a first amount of current drawn by the motor to maintain the blower impeller at the set angular speed when the blower impeller is locked, and wherein the blower impeller missing value is representative of a second amount of current drawn by the motor to maintain the blower impeller at the set angular speed when the blower impeller is inoperative.

12. The non-transitory computer-readable medium of claim 11, wherein the malfunction of the blower impeller comprises the blower impeller being locked.

13. The non-transitory computer-readable medium of claim 11, wherein the malfunction of the blower impeller comprises the blower impeller being inoperative.

14. The non-transitory computer-readable medium of claim 12, wherein detecting that the blower impeller is locked comprises determining that the current value is greater than or equal to the blower impeller locked value.

15. The non-transitory computer-readable medium of claim 12, wherein detecting that the blower impeller is inoperative comprises determining that the current value is less than or equal to the blower impeller missing value.

16. The non-transitory computer-readable medium of claim 11, wherein the vent comprises at least one of an intake vent and an exhaust vent.

17. The non-transitory computer-readable medium of claim 11, wherein the operations performed by the controller further comprising:

generating and transmitting an error signal responsive to detecting at least one of the blockage in the vent and the malfunction of the blower impeller; and shutting down the temperature control system responsive to detecting the malfunction of the blower impeller.

18. The non-transitory computer-readable medium of claim 11, wherein the operations performed by the controller further comprise generating and transmitting a warning signal responsive to determining that the blockage in the vent is not critical.

* * * * *